(12) United States Patent
Schenk et al.

(10) Patent No.: US 9,042,738 B2
(45) Date of Patent: May 26, 2015

(54) ILLUMINATION DEVICE AND METHOD FOR EMBEDDING DATA SYMBOLS IN A LUMINANCE OUTPUT

(75) Inventors: Tim Corneel Wilhelmus Schenk, Eindhoven (NL); Matthias Wendt, Wurselen (DE); Harald Josef Günther Radermacher, Aachen (DE); Johan Wilhelmus Hermanus Kuppen, Hertogenbosch (NL)

(73) Assignee: Koninklijke Philips N.V., Eindhoven (NL)

( * ) Notice: Subject to any disclaimer, the term of this patent is extended or adjusted under 35 U.S.C. 154(b) by 117 days.

(21) Appl. No.: 13/256,241

(22) PCT Filed: Mar. 8, 2010

(86) PCT No.: PCT/IB2010/050983
§ 371 (c)(1),
(2), (4) Date: Sep. 13, 2011

(87) PCT Pub. No.: WO2010/103451
PCT Pub. Date: Sep. 16, 2010

(65) Prior Publication Data
US 2012/0002974 A1    Jan. 5, 2012

(30) Foreign Application Priority Data

Mar. 13, 2009  (EP) ..................................... 09155067

(51) Int. Cl.
*H04B 10/00* (2013.01)
*H04B 10/116* (2013.01)
*H04B 10/114* (2013.01)

(52) U.S. Cl.
CPC .......... *H04B 10/116* (2013.01); *H04B 10/1149* (2013.01)

(58) Field of Classification Search
USPC .......................................................... 398/172
See application file for complete search history.

(56) References Cited

U.S. PATENT DOCUMENTS

| | | | |
|---|---|---|---|
| 6,614,126 B1 * | 9/2003 | Mitchell | 307/9.1 |
| 8,565,607 B2 * | 10/2013 | Kang et al. | 398/128 |
| 2004/0105264 A1 * | 6/2004 | Spero | 362/276 |
| 2006/0239689 A1 | 10/2006 | Ashdown | |
| 2007/0008258 A1 | 1/2007 | Yamamoto | |

FOREIGN PATENT DOCUMENTS

| | | | |
|---|---|---|---|
| EP | 1912354 A1 * | 4/2008 | |
| JP | 2010103851 A * | 5/2010 | |
| WO | 2007037122 A1 | 4/2007 | |

OTHER PUBLICATIONS
Damink et al., "A method for determining the position of an object in a structure", 2007, pp. 1-14.

* cited by examiner

*Primary Examiner* — Ken Vanderpuye
*Assistant Examiner* — Jai Lee
(74) *Attorney, Agent, or Firm* — Meenakshy Chakravorty

(57) ABSTRACT

The invention relates to embedding data symbols of a data signal into a luminance output of an illumination device. The device includes a controller configured for receiving a first base pattern and a second base pattern within a frame period, and generating a shifted second pattern by phase shifting the second base pattern within the frame period with respect to the first base pattern in response to the data signal such that the data symbols are embedded in the luminance output of the device. The device also includes a first light source configured to generate a first luminance output in response to the first base pattern and a second light source configured to generate a second luminance output in response to the shifted second pattern. The first and second luminance outputs have different output spectra and the luminance output of the illumination device comprises both the first and second luminance outputs. With this approach, the short-time average light output of the illumination device remains constant, decreasing the visible flicker and allowing the use of lower switching frequencies relative to the prior art approaches.

19 Claims, 9 Drawing Sheets

ILLUMINATION DEVICE AND METHOD FOR EMBEDDING DATA SYMBOLS IN A LUMINANCE OUTPUT

FIELD OF THE INVENTION

Embodiments of the present invention relate generally to the field of illumination devices, optical receivers, illumination systems and methods and, more specifically, to devices and methods for embedding data symbols of a data signal into the luminance output of such illumination devices.

DESCRIPTION OF THE RELATED ART

In recent years, highly advanced illumination systems are being developed that allow consumers to obtain a desired ambiance for a particular room or space. These illumination systems move away from the traditional control of individual light sources (switching on/off and dimming) to scene setting, where sets of light sources are controlled simultaneously. An example of such an illumination system is an arrangement of several sets of light sources in a structure (for example, a room, a lobby or a vehicle).

For these scene setting applications, intuitive user interaction is identified as one of the most important success factors. Providing a user with information related to the light sources, such as localized identification of the light sources, their capabilities and current settings, is the key for enabling an intuitive interaction. One technique that has been proposed to provide the user with such information is based on embedding codes (also referred to as "identifiers") identifying a light source or a group of light sources by modulating the luminance output of the illumination device in a manner so that the embedded codes are invisible to the consumers. The embedded codes are received by an optical receiver which may, for example, be implemented in a remote control for controlling the illumination devices or included in another unit such as a switch or a sensor device.

The early implementations of this technique were based on embedding the identifiers in the light output intensity of the light sources. However, it was later shown that the human eye is more sensitive to light power changes than to light color changes. Consequently, more recently methods have been proposed to embed identifiers in the color output and the way a color from different color channels is mixed. For example, US 2007/0008258 discloses a method for embedding data in the different color channels separately and having color matched receivers. US 2007/0008258 describes an optical communication system that includes a transmitter having multiple light-emitting diodes that each emit light of different wavelengths and that provides light for lighting by a combination of light of two or more different wavelengths. The transmitter divides a series of input signals into multiple signals corresponding to light of the different wavelengths, feeds each of the multiple signals to the multiple light-emitting elements, and performs code-division multiple access communication by modulation of emission intensity of the multiple light-emitting elements. The optical communication system also includes terminal equipment that has a receiver which comprises multiple light-receiving elements that receive optical signals from the transmitter for each of the corresponding wavelengths. The receiver of the terminal equipment generates output signals from the reception signals of the multiple light-receiving elements.

Both embedding data by modulating intensity and embedding data by modulating color result in a varying time-average output per color channel. Consequently, one drawback of all previous implementations of embedding identifiers in luminance outputs of illumination devices is that visible flicker occurs unless reasonably high switching frequencies are used. Another drawback of the previous implementations is low data throughput, especially when long addresses are used for identification of the light sources (e.g., world-wide unique addresses).

As the foregoing illustrates, what is needed in the art is a technique for embedding data into a luminance output of an illumination device that can avoid visible flicker and increase data throughput without increasing the switching frequency.

SUMMARY OF THE INVENTION

It is an object of the invention to provide an illumination device, an illumination system and a method capable of embedding data symbols in the luminance output. It is also an object to provide an optical receiver capable of receiving and processing luminance output containing embedded data.

One embodiment of the present invention sets forth an illumination device for embedding one or more data symbols of a data signal into a luminance output of the illumination device. The device includes a controller configured for receiving a first base pattern and a second base pattern within a frame period, where, as used herein, the term "base pattern" refers to one or more base pulses within a frame period. The controller is further configured for generating a shifted second pattern by phase shifting the second base pattern within the frame period with respect to the first base pattern in response to the data signal such that the one or more of the data symbols are embedded in the luminance output of the illumination device. As used herein, the term "pattern" refers to one or more pulses within a frame period. The controller may be implemented in hardware, in software, or as a hybrid solution having both hardware and software components. The device also includes a first and a second light source. The first light source is configured to generate a first luminance output in response to the first base pattern. The second light source is configured to generate a second luminance output in response to the shifted second pattern generated by the controller, where the first luminance output and the second luminance output have different output spectra. The luminance output of the illumination device comprises both the first luminance output and the second luminance output.

Moreover, a method for embedding one or more data symbols of a data signal into a luminance output of an illumination device is disclosed. The method includes the steps of receiving a first base pattern and a second base pattern within a frame period and generating a shifted second pattern by phase shifting the second base pattern within the frame period with respect to the first base pattern in response to the data signal comprising data symbols such that the one or more of the data symbols are embedded in the luminance output of the illumination device. The method also includes the steps of generating a first luminance output in response to the first base pattern and generating a second luminance output in response to the shifted second pattern. The luminance output of the illumination device comprises the first luminance output and the second luminance output, and the first luminance output and the second luminance output have different output spectra.

In order to enable retrieving the data symbols of the data signal from the luminance output of the illumination device, an optical receiver is disclosed. The disclosed optical receiver includes an optical detector configured for separately detecting a first luminance output and a second luminance output of the illumination device, where the luminance output of the illumination device comprises the first luminance output and the second luminance output, and the first luminance output and the second luminance output have different output spectra. Such functionality may be implemented, for example, by the use of photo sensors with different color filters. The receiver also includes a processing unit configured for receiving a first base pattern and a second base pattern within a frame period, and receiving a shifted second pattern based on the detected second luminance output of the illumination device. In addition, the processing unit is configured for determining, for the frame period, a first phase difference between the second base pattern and the first base pattern, and determining a second phase difference between the shifted second pattern and the first base pattern for the frame period. Furthermore, the processing unit is configured for determining one or more data symbols of a data signal by comparing the second phase difference with the first phase difference for the frame period. Such a receiver may be implemented, for example, in a remote control for controlling the illumination devices or included in another unit such as a switch or a sensor device.

As used herein, the terms "phase shift" or "phase difference" refer to the time difference between the pattern of a reference channel and the pattern of a non-reference channel within a frame period. The terms "color channel" or "channel" refer to one or more of light sources having substantially the same output spectrum (i.e., to a collection of substantially same-color light sources). The channel for which the locations of the base patterns are kept constant is referred to herein as a "reference channel." The channel for which the locations of the base patterns are phase shifted with respect to the base patterns of the reference channel is referred to as a "non-reference channel." As used herein, the phrase "location of a pattern" or "location of a pulse" refers to a temporal position of the pattern within a frame period. Thus, for example, the phrase "the channel for which the locations of the base patterns are phase shifted" refers to the channel for which the temporal positions of the base patterns are shifted (i.e., shifted in time).

Any of the patterns repeating with a frame period (i.e., the first base pattern, the second base pattern, the shifted second pattern) may comprise a single pulse within the frame period (as is the case, for example, when the pattern repeating with the frame period constitutes a pulse width modulated signal) or more than one pulse within the frame period (as is the case, for example, when the pattern repeating with the frame period constitutes a pulse density modulated signal).

The gist of the present invention resides in embedding data into a luminance output of the illumination device by circularly phase shifting the locations of the base patterns of a non-reference color channel within the frame periods (i.e., by modulating the phase difference). With this approach, the short-time average light output of the illumination device remains constant, decreasing the visible flicker and allowing the use of lower switching frequencies relative to the prior art approaches. The receiver can extract the embedded data by comparing, for each of the frame periods for each of the non-reference color channels, the phase difference between the base patterns of the reference and the non-reference channels with the phase difference between the base pattern of the reference channel and the shifted pattern of the non-reference channels.

The light sources may comprise high/low pressure gas discharge sources, inorganic/organic light emitting diodes, laser diodes, incandescent sources, or halogen sources. Data embedded in the luminance output of the illumination device may comprise localized identification of the light sources, their capabilities and current settings, or other types of information related to the light sources. However, it should be noted that the disclosed illumination device is not necessarily applied for the purpose of illuminating a space or area but may also be applied for data communication as such. As an example, the illumination device may constitute an access point to a network. For such applications, at least part of the luminance output produced by the illumination device may lie outside of the visible spectrum (i.e., the light output of one of the light sources of the system may lie outside of the visible spectrum.

It should also be noted that binary modulation of the phase difference is not necessary. Other types of modulation have been envisaged as well, including analogue modulation with an amplitude modulated control signal or digital modulation comprising multiple levels. A phase shift may, for example, have four positions that allow two bits to be included in the luminance output during a frame period. Claims 4, 5, 10, and 14 advantageously allow for differences in the types of the data signal embedded in the luminance output of the illumination devices (i.e., for differences in the modulation techniques).

The embodiments of claims 2, 3, and 13 allow for higher data rates within a frame period. The embodiments of claims 2 and 13 provide further light sources and, thus, further phase differences that can be modulated to embed data symbols in the luminance output. The embodiment of claim 3 provides for the means of separating the data signal into individual data streams for each of the non-reference color channels.

The embodiments of claims 6 and 9 allow for the optical receiver to obtain the base patterns used for retrieving the data symbols embedded in the luminance output of the illumination device. In some embodiments, the illumination device may directly provide the first base pattern and the second base pattern to the optical receiver, either before the controller within the illumination device starts or after the controller stops phase shifting the second base pattern (claims 6 and 9). In other embodiments the receiver may include a memory storing the base patterns (claim 8). In yet other embodiments, the receiver may be configured to obtain the base patterns from the (wirelessly) received light signals. For example, the light sources of the illumination device may be configured to generate their respective luminance outputs in response to the respective base patterns for the duration of a training time period. During the training time period, the receiver may obtain the base patterns from the detected luminance output of the illumination device because in that time period the controller does not phase shift the second base pattern. Such training period may occur, for example, every time the dimming level of the color channels is changed. The base patterns obtained from the received light signals may be stored in memory within the optical receiver for later use. Alternatively, the optical receiver may receive not the base patterns themselves, but derivatives thereof (i.e., parameters from which the base patterns may be obtained). For example, the illumination device may provide parameters describing the base patterns, such as the dimming type (e.g., PWM) and the dimming level (e.g., 46%). The base patterns may then be generated at the optical receiver, advantageously reducing the amount of communication provided to the optical receiver. In another embodiment, the parameters describing the base patterns may be extracted from the received light signals. In yet another embodiment, the base patterns may be obtained by estimating the duty cycle per color channel (i.e., by estimating which percentage of the time the light source is switched to "on" position) and locally generating the corresponding base pattern. Such an estimation and base pattern generation may be implemented using an algorithm in a processing unit within the optical receiver or using a look up table stored in the memory within the optical receiver.

Embodiment of claim 15 provides a computer program comprising software code portion for implementing the functionality recited in claim 7. Such a computer program may, for example, be downloaded to the existing optical receivers or be stored upon manufacturing of the optical receivers.

Finally, an illumination system comprising an illumination device and a remote control accommodating an optical receiver is proposed (claim 11).

Hereinafter, an embodiment of the invention will be described in further detail. It should be appreciated, however, that this embodiment may not be construed as limiting the scope of protection for the present invention.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
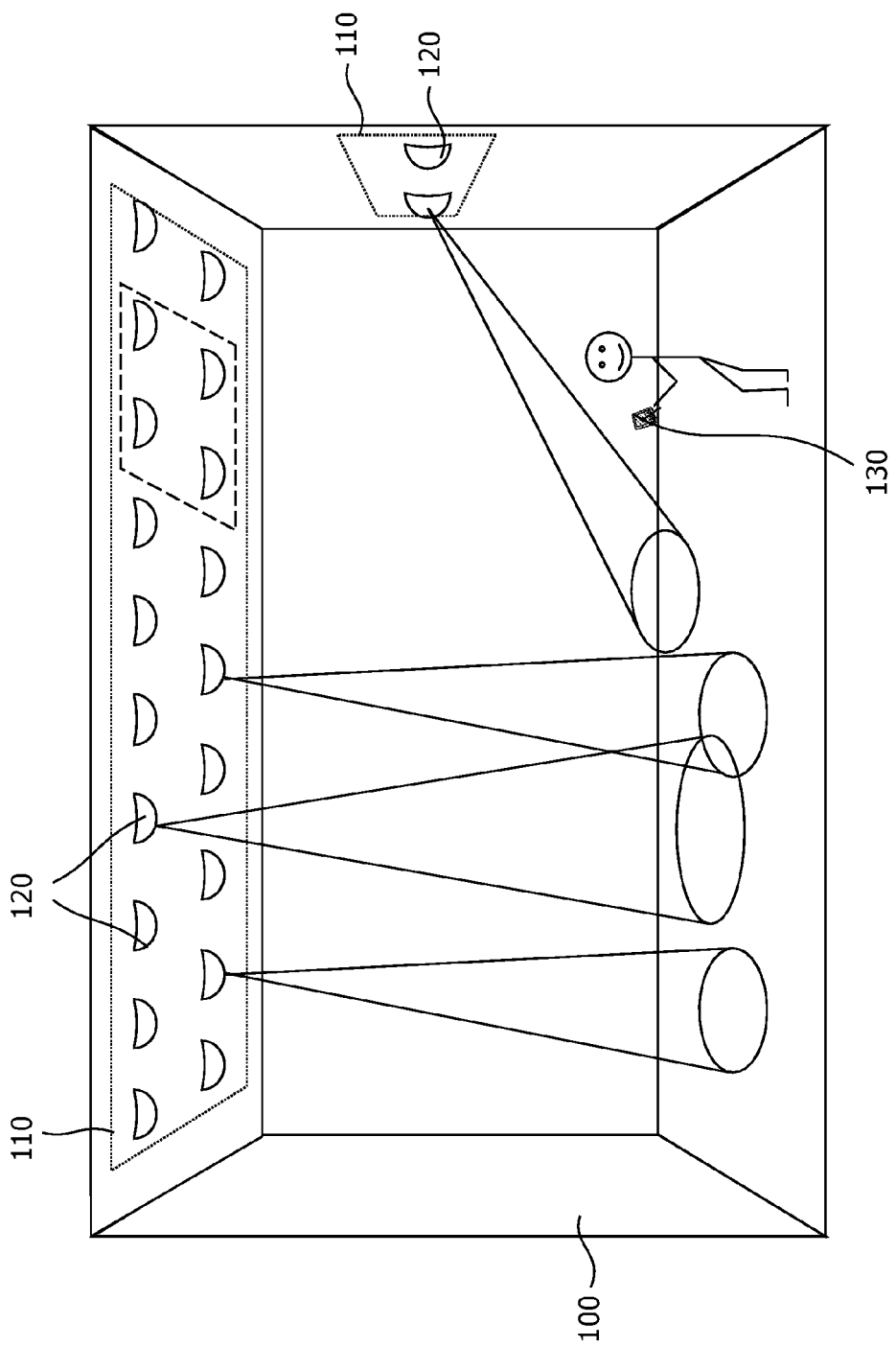
FIG. 1 is a schematic illustration of an illumination system installed in a structure according to one embodiment of the present invention.

FIG. 1 shows a structure 100—in this case a room—with an installed illumination system 110. The illumination system 110 comprises a plurality of illumination devices 120. The illumination devices 120 may comprise high/low pressure gas discharge sources, inorganic/organic light emitting diodes, laser diodes, incandescent sources, or halogen sources. The illumination system 110 may further comprise a remote control 130 allowing a user to control the illumination devices 120.

Figure 2:
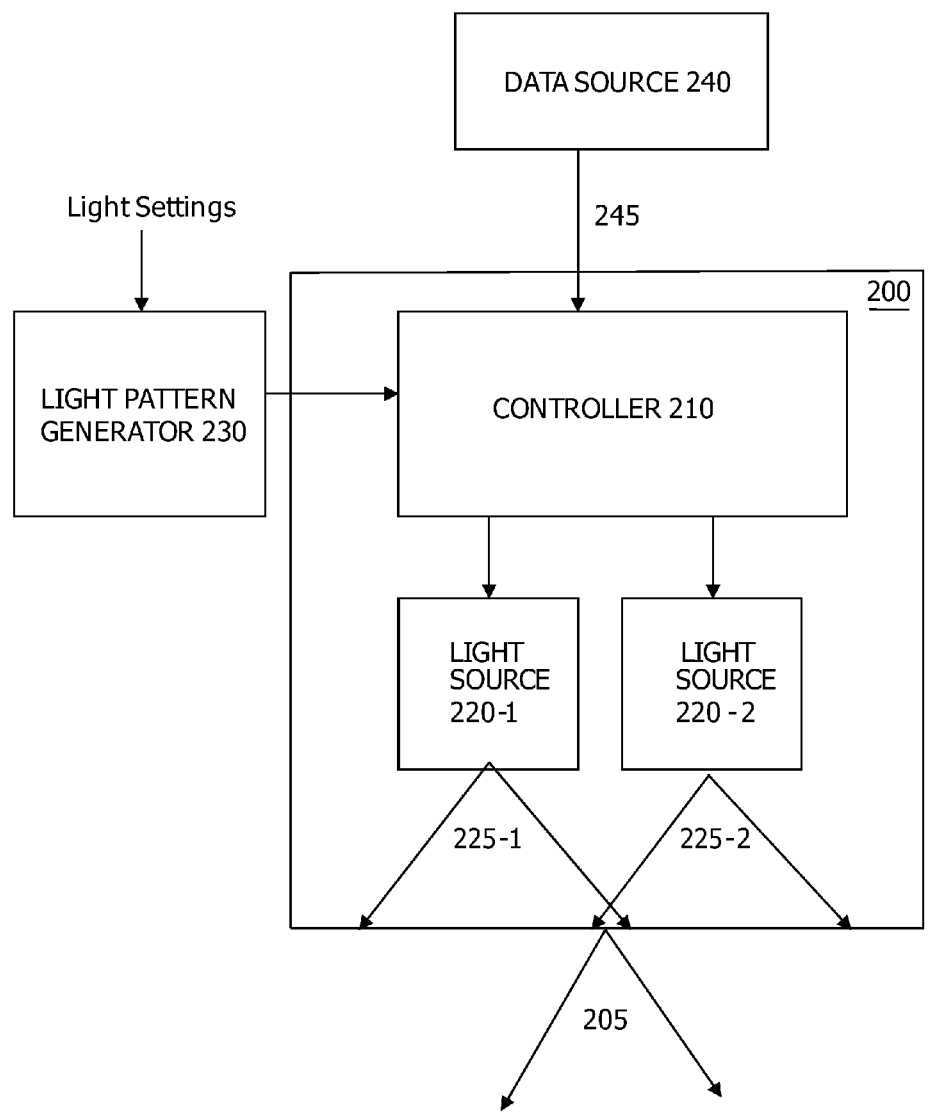
FIG. 2 is a schematic illustration of an illumination device according to one embodiment of the present invention.

FIG. 2 is a schematic illustration of an illumination device 200 according to one embodiment of the present invention. The illumination device 200 includes at least a controller 210, a light source 220-1 and a light source 220-2, and is configured to generate a luminance output 205 according to light settings. The illumination device 200 is configured to operate as follows. As shown in FIG. 2, the light settings for the illumination device 200 are provided to a light pattern generator 230 (which, optionally, may be included within the illumination device 200). The light settings indicate what the average luminance output 205 should be in terms, for example, of light power, e.g. defined in lumen, and color. The light settings may be provided by a user via the remote control 130 or may be preprogrammed and provided from an external unit controlling the scene setting. Alternatively, the light settings may be preprogrammed and stored in a memory within the light pattern generator 230 or within the illumination device 200. The light pattern generator 230 translates the light settings into different electrical drive signals for different color channels and provides the drive signals to the controller 210. Again, as used herein, the term "color channel" refers to one or more of light sources having substantially the same output spectrum (i.e., to a collection of substantially same color light sources). The controller 210, in turn, drives the different light sources with their respective drive signals to produce the luminance output 205. Thus, the controller 210 is configured to drive the light source 220-1 with a first drive signal to produce a luminance output 225-1, and drive the light source 220-2 with the second drive signal to produce a luminance output 225-2. The luminance outputs 225-1 and 225-2 have different output spectra (i.e., the light source 220-1 and the light source 220-2 are different color channels). The luminance output 205 of the illumination device 200 comprises both the luminance output 225-1 and the luminance output 225-2.

Figure 3:
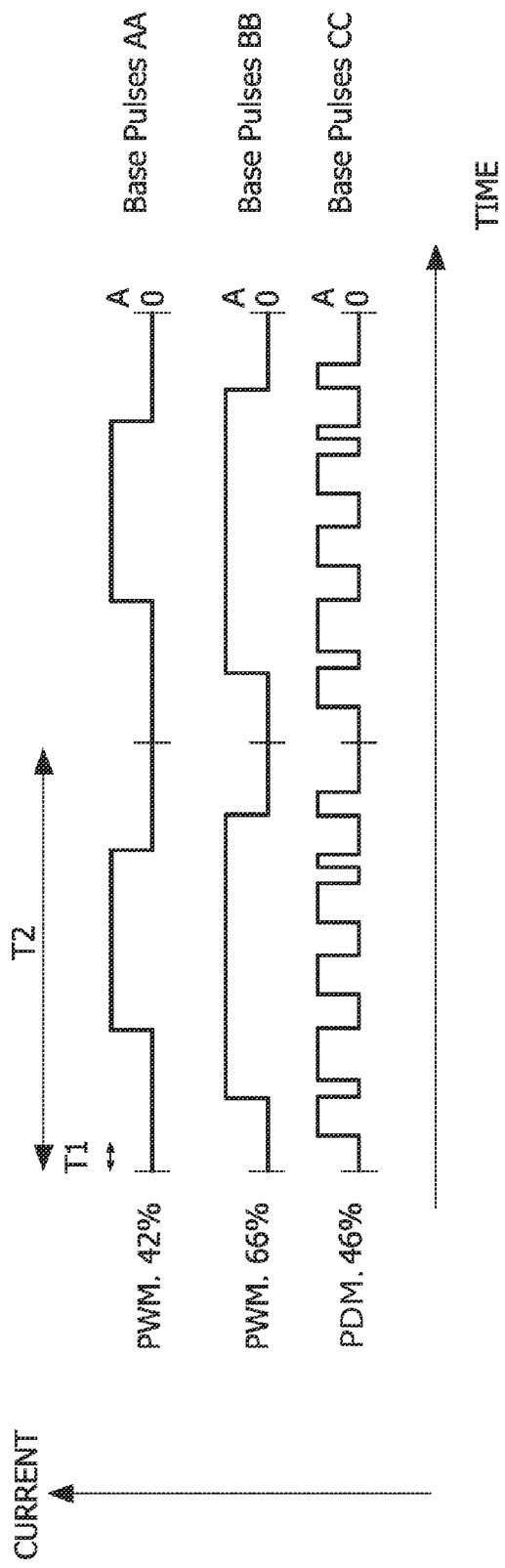
FIG. 3 is a schematic illustration of various dimming methods.

As previously described, the light settings indicate what the luminance output 205 of the illumination device 200 should be in terms, for example, of light color. The color change of the luminance output 205 may be achieved by differently dimming the different color channels via controlling the drive signals provided to the controller 210 from the light pattern generator 230. For a constant dimming level per channel, the drive signal that is provided from the light pattern generator 230 to the controller 210 comprises a repeated pattern of pulses, repeating with a certain frame period. One type of dimming may be implemented using pulse density modulation (PDM), where density of pulses corresponds to the average light power output. Another type of dimming may be implemented using pulse width modulation (PWM), where a light source is switched to the on-level only a percentage of the time of the frame period and the remainder of the time it is switched off. For the PWM implementation, the light pattern generator 230 may comprise a pulse width modulator, such as the one commonly used in microprocessors. For both of these implementations the higher the light output level, the longer the relative on-time is (i.e., the longer the pulses) during a frame period. FIG. 3 illustrates exemplary drive signals implemented using PWM for two different light output levels, 42% and 66% of the maximum output level, and a drive signal implemented using PDM for the light output level of 46%. The horizontal axis is used to indicate time and the vertical axis is used to indicate nominal current applied to the different light sources in order to drive the light sources to produce luminance output. As shown, when the light source is switched on, nominal current A is applied to the light source for a duration of time within a frame period T2. When the light source is switched off, no current is applied. Thus, FIG. 3 illustrates that, for example, a drive signal comprising base pulses AA repeating with a frame period T2 may be applied to one light source to achieve 42% of the maximum light output, using PWM dimming Similarly, a drive signal comprising base pulses BB repeating with the frame period T2 may be applied to another light source to achieve 66% of the maximum light output. Alternatively, a drive signal comprising a set of base pulses CC repeating with the frame period T2 may be applied to a third light source to achieve 46% of the maximum light output. This set of pulses is based on what we define as pulse density modulation (PDM). Time period T1 indicates the smallest resolution that can be addressed.

Returning back to FIG. 2, the controller 210 is further configured to receive a data signal 245 from a data source 240. The data signal 245 comprises data symbols, and the controller 210 is configured to embed the data symbols into the luminance output 205 of the illumination device 200. The data symbols may represent, for example, a localized identification of the illumination device 200, the light sources 220-1 and 220-2, their capabilities and current light settings, or other type of information related to the illumination device. As described below, the controller 210 embeds the data symbols by keeping the locations of base pulses of one color channel constant (again, this channel is referred to as a "reference channel") during a sequence of frame periods while circularly shifting, with respect to the base pulses of the reference channel, the locations of the base pulses of another channel within one or more of the frame periods of length T2. The channel for which the locations of the base pulses are shifted is referred to as a "non-reference channel." In this manner, the data symbols are embedded in the phase difference between the pulses of the different color channels for each of the frame periods T2. Such embedding technique is referred to, therefore, as an "inter-color phase modulation." As used herein, the terms "phase difference" and "phase shift" refer to the time difference between a pulse of a reference and a pulse of a non-reference channel within a frame period T2.

Figure 4:
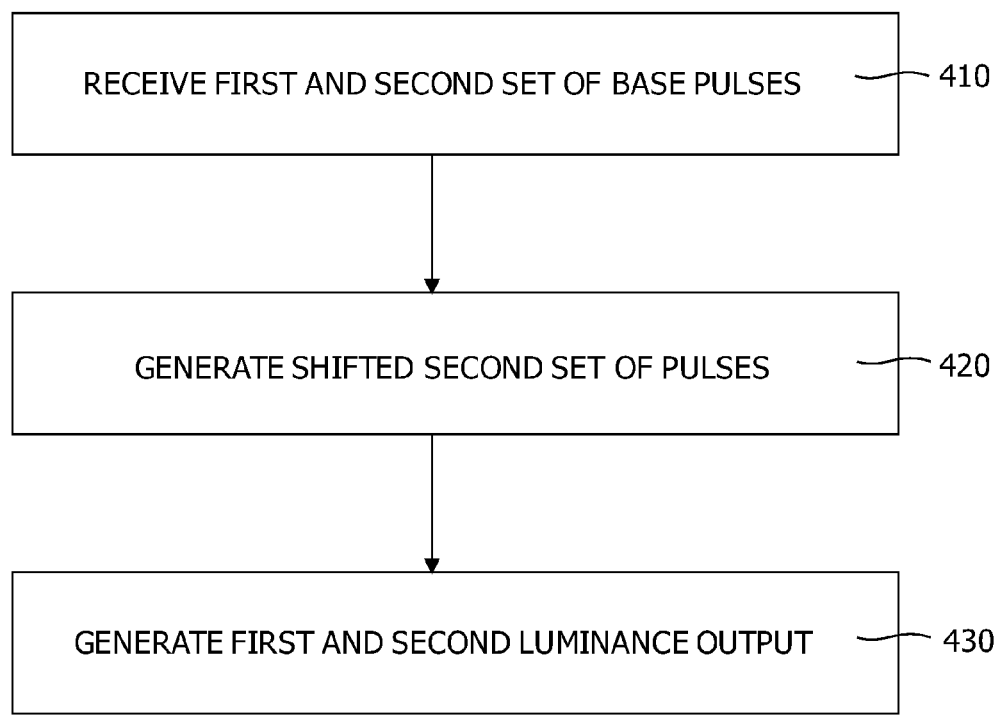
FIG. 4 is a flow diagram of method steps for embedding one or more data symbols of a data signal into a luminance output of an illumination device, according to one embodiment of the present invention.

FIG. 4 is a flow diagram of method steps for embedding one or more data symbols of the data signal 245 into the luminance output 205 of the illumination device 200 using the inter-color phase modulation technique, according to one embodiment of the present invention. While the method steps are described in conjunction with FIGS. 1, 2, and 6, persons skilled in the art will recognize that any system configured to perform the method steps, in any order, is within the scope of the present invention.

The method begins in step 410, where the controller 210 receives from the light pattern generator 230 a first base pattern and a second base pattern within the frame period T2. Each of the first and the second base patterns may include only one pulse within the frame period T2 (as shown in FIG. 3 with base pulses AA or base pulses BB) or may include more than one pulse within the frame period T2 (as shown in FIG. 3 with base pulses CC).

In step 420, the controller 210 generates a shifted second pattern by (circularly) phase shifting the second base pattern within the frame period T2 with respect to the first base pattern in response to (i.e., in dependence of) the data signal 245 comprising data symbols. Since the first base pattern is not shifted, the first base pattern is a drive signal for the reference channel while the shifted second pattern is a drive signal for the non-reference channel.

Figure 5:
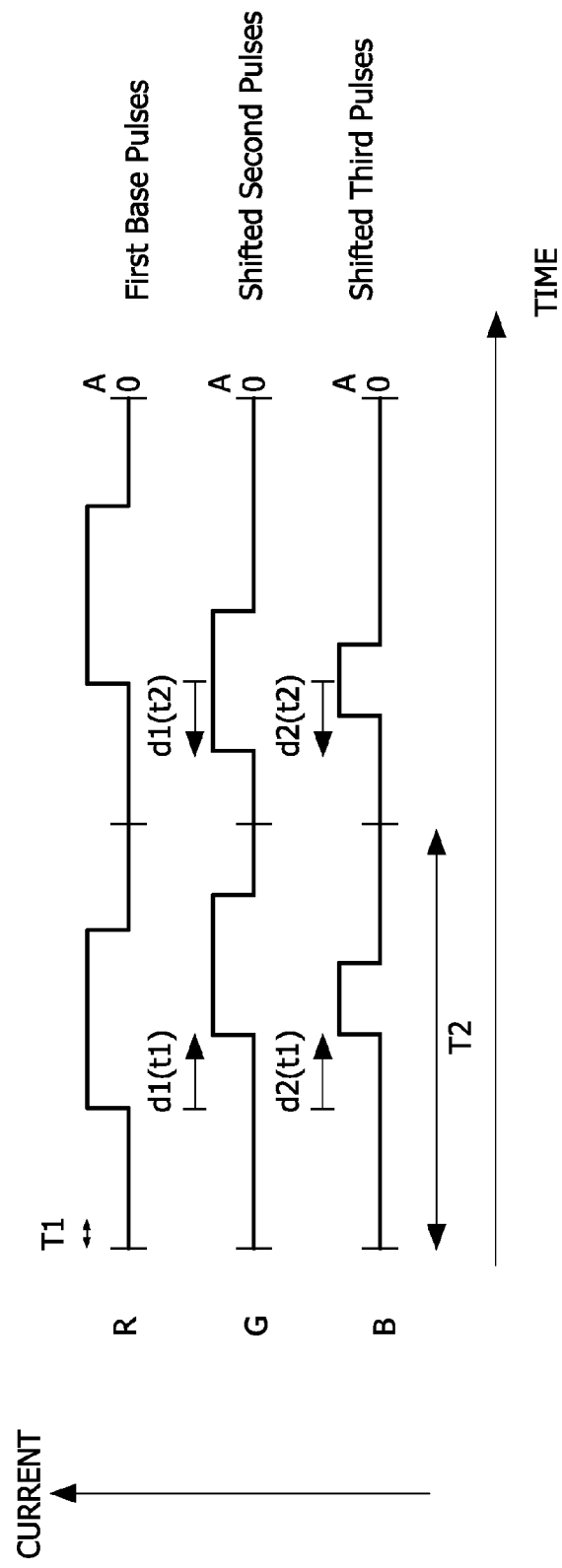
FIG. 5 is a schematic illustration of inter-color phase modulation, according to one embodiment of the present invention.

As illustrated and described in greater detail in FIG. 5, the controller 210 is configured to generate the shifted second pattern such that one or more of the data symbols are embedded in the luminance output 205 of the illumination device 200. The method ends in step 430, where the light source 220-1 generates the luminance output 225-1 in response to the first base pattern and the light source 220-2 generates the luminance output 225-1 in response to the shifted second pattern. As previously described, in such an embodiment, the luminance output 205 of the illumination device 200 comprises the luminance output 225-1 and the luminance output 225-2 having different spectra.

FIG. 5 is a schematic illustration of inter-color phase modulation, according to one embodiment of the present invention. In FIG. 5, PWM dimming is chosen as an example. Furthermore, FIG. 5 illustrates inter-color phase modulation in an illumination device having three color channels—Red (R), Green (G), and Blue (B), i.e., the illumination device 200 includes three light sources. Similarly to FIG. 3, T1 refers to the smallest resolution that can be addressed and T2 refers to the frame period.

At least one of the three color channels should be set as a reference channel. In FIG. 5, the R channel is the reference channel and no phase difference modulation is applied there. In other embodiments, the embedding of the data signal 245 can also be achieved by modulating the R channel or the combination of both the R and the G channels while keeping the locations of the base pulses of the B channel constant. When one of the channels is not modulated, it can be considered a reference channel. In theory, more than one channel may be used as reference channels. Furthermore, reference channel may change over time, depending, among other things, on the light settings. For example, initially, red color channel may serve as a reference channel because at that time red color is needed in the luminance output of the illumination device. However, when red color is no longer needed in the luminance output of the illumination device, another color channel may serve as a reference channel.

Since in the example of FIG. 5, two other channels are available beside the reference channel, the data signal 245 may be embedded via two parallel data streams. These data streams are indicated in FIG. 5 as d1 and d2. Thus, data stream d1 is embedded by phase shifting the base pulses of the G channel relative to the R channel, and data stream d2 is embedded by phase shifting the base pulses of the B channel relative to the R channel. In alternative embodiments, d2 may also be embedded by phase shifting the base pulses of the B channel relative to the G channel.

Note that there are different ways to embed data in a phase shift. The first and most straightforward method is the use of a binary modulation (i.e., the data signal 245 is a binary signal). For this case, the direction of the phase difference determines the data. For example, a negative shift may represent a logical "0" and a positive shift may represent a logical "1." In such a case in the example of FIG. 5, d1(t1) would signify a "1" and d1(t2) would signify a "0."

Alternatively, the modulation could be multilevel, where both the direction and the magnitude of phase difference determines the data (i.e., the data signal 245 is a multilevel signal). For example a negative shift over one T1 period may represent a logical "00", a negative shift over two T1 periods may represent a logical "01", a positive shift over one T1 period may represent a logical "10" and a positive shift over two T1 periods may represent a logical "11." In the example of FIG. 5, d2(t1) would signify a "11" and d2(t2) would signify a "00." Thus, one or more data symbols may be embedded within each frame period T2 of a non-reference channel. Note also that data symbols may be embedded when the phase shift is zero. The use of a circular shift in the frame period has a clear advantage over a normal (i.e., non-circular) shift, especially in the case for high output levels. For these long pulse for PWM as example, only a small number of shift are possible with a normal shift and hence only a small number of bits can be embedded. For circular shift the number of bits that can be embedded is independent of the length of the pulse, i.e. the dimming level. The number of possible shifts is always equal to the ratio between T1 and T2.

Figure 6:
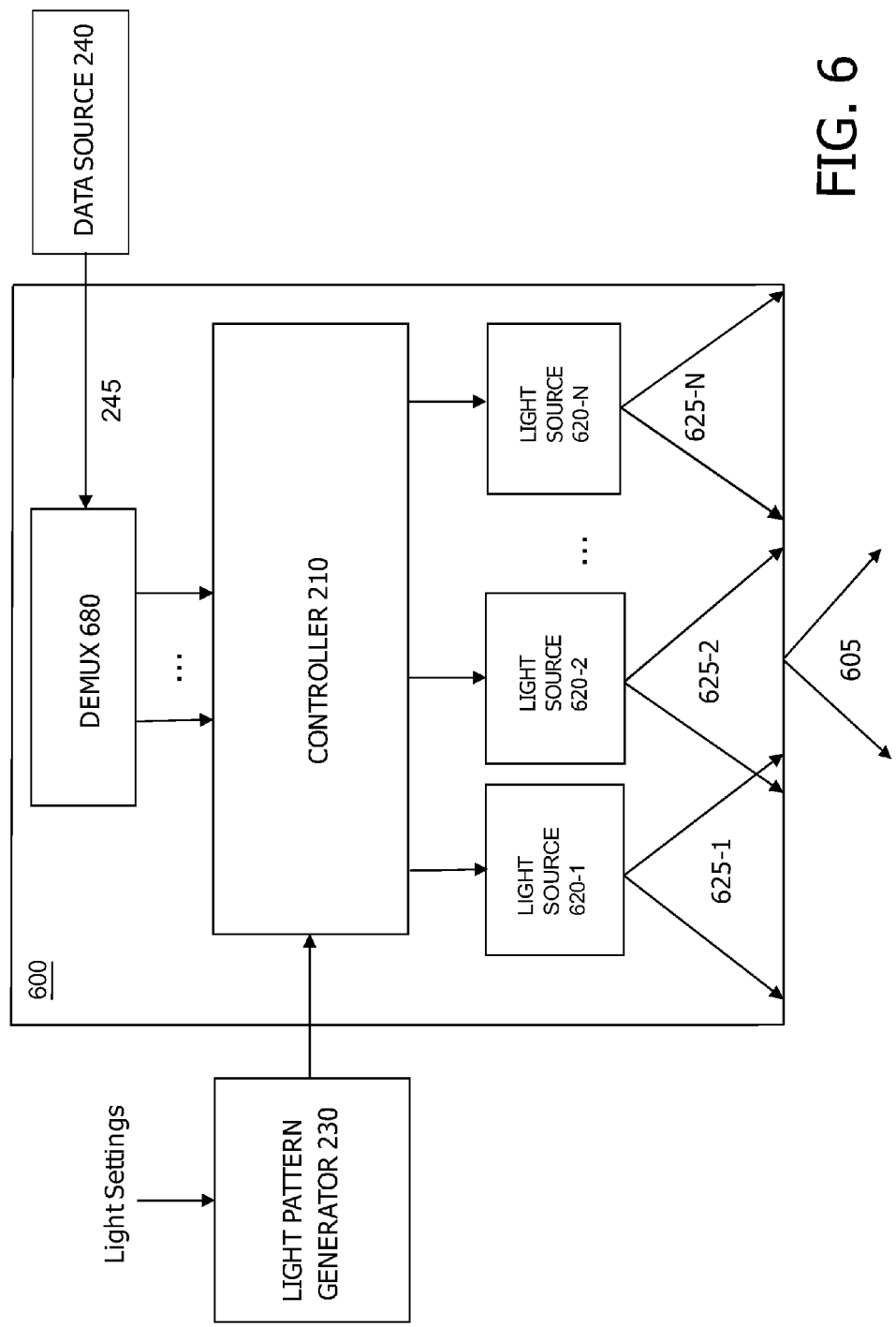
FIG. 6 is a schematic illustration of an illumination device according to another embodiment of the present invention.

FIG. 6 is a schematic illustration of an illumination device 600 according to one embodiment of the present invention. The illumination device 600 is configured to operate similarly to the illumination device 200, but it comprises additional elements. As shown, the illumination device 600 includes N light sources 620-1, 620-2, ... 620-N, where N is an integer greater than 2. The controller 210 is configured to drive the light source 620-1 with a first drive signal to produce a luminance output 625-1, the light source 620-2 with a second drive signal to produce a luminance output 625-2, and so on. The luminance outputs 625-1 through 625-N have different output spectra (i.e., the light sources 620-1 through 620-N are different color channels). In this embodiment, a luminance output 605 of the illumination device 620 comprises all of the luminance outputs 625-1 through 625-N. Again, the light pattern generator 230 may be included within the illumination device 600.

Since the illumination device 600 includes N light sources, one of them may be designated as a reference channel while the other N-1 light sources may be designated as non-reference channels. Therefore, as also shown in FIG. 6, the illumination device 600 further includes a demultiplexer 680. In such an embodiment, the data source 240 is configured to provide the data signal 245 to the demultiplexer 680 that demultiplexes the data signal 245 into N-1 parallel data streams (for example, for the case described in FIG. 5, the demultiplexer 680 is configured to demultiplex the data signal 245 into first and second data streams d1 and d2). Note that, in one embodiment, different non-reference channels may be designated to embed different types of data. For example, one channel may be used for signaling, another channel may be used for payload data, yet another one—for temperature information. The controller may then generate one shifted pattern by phase shifting the base pattern of the first non-reference channel in response to the first data stream of the data signal 245, generate another shifted pattern by phase shifting the base pattern of the second non-reference channel in response to the second data stream of the data signal 245, and so on.

Each of the illumination devices 200 or 600 may be used as illumination devices 120 within the system 110. In various embodiments, each of the light sources 220-1, 220-2, 620-1 through 620-N may comprise a set of light sources having essentially the same output spectrum. The data source 240 and the light pattern generator 230 may also be included within the illumination devices 200 and 600. Furthermore, the controller 210 may be implemented in hardware, in software, or as a hybrid solution having both the hardware and the software components.

Figure 7:
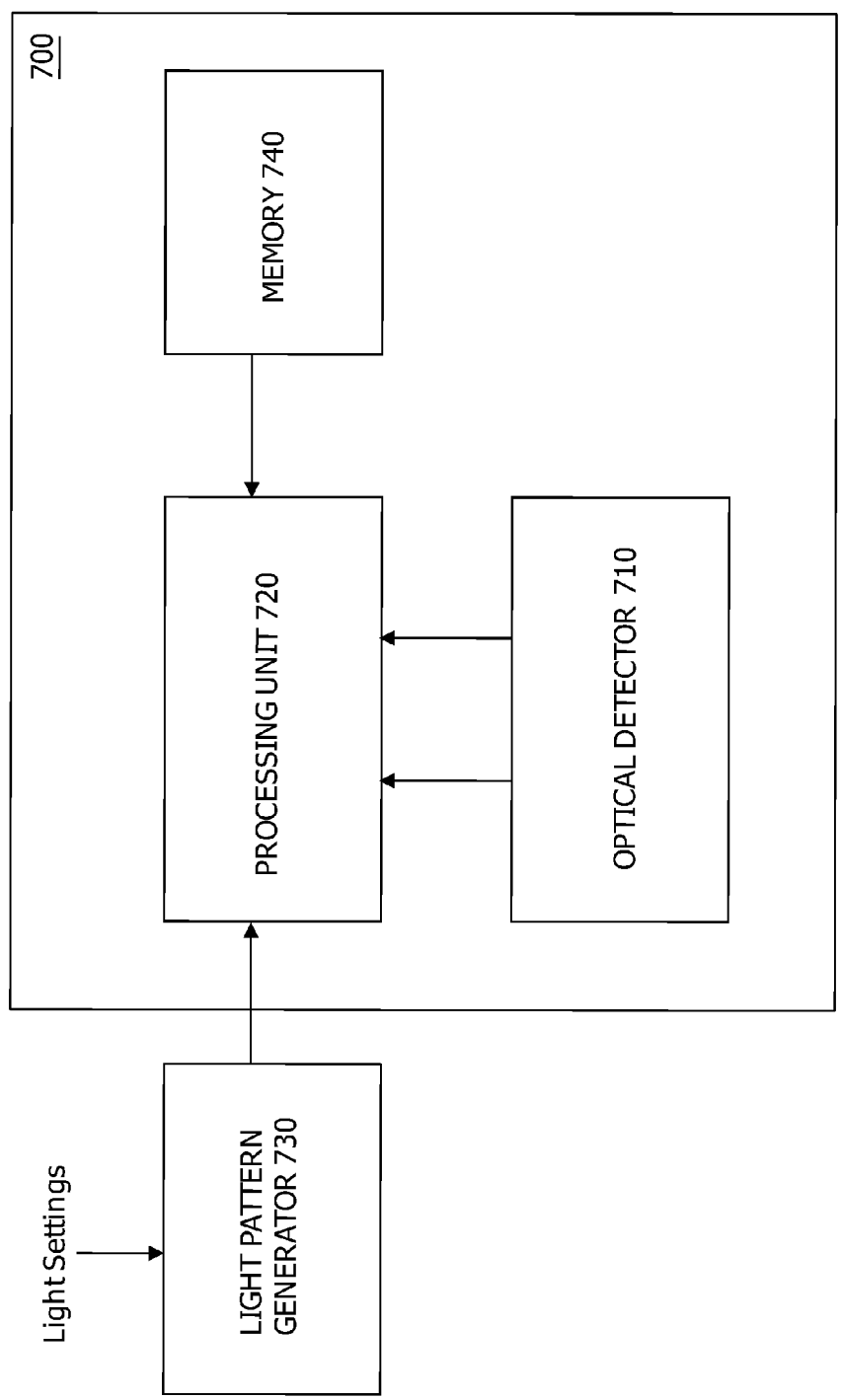
FIG. 7 is a schematic illustration of an optical receiver according to one embodiment of the present invention.

FIG. 7 is a schematic illustration of an optical receiver 700 according to one embodiment of the present invention. The optical receiver 700 is configured for use with the illumination device 600 (or the illumination device 200). The optical receiver 700 is configured to determine one or more data symbols of the data signal 245 embedded in the luminance output 605 of the illumination device 600. As shown, the optical receiver 700 includes an optical detector 710 configured for separately detecting the luminance outputs of each of the color channels of the illumination device 600, for example, by the use of photo sensors with different color filters. The output signals of the photo sensors are digitized and transmitted to a processing unit 720. Thus, as the optical detector 710 detects the luminance output 625-1 generated by the light source 620-1 (the reference channel in the above example), the optical detector 710 digitizes the detected luminance output 625-1 to recover the first set of base pulses or a derivative thereof. As the optical detector 710 detects the luminance output 625-2 generated by the light source 620-2 (the non-reference channel in the above example), the optical detector 710 digitizes the detected luminance output 625-2 to recover the shifted second set of pulses or a derivative thereof, and so on.

Even though herein we describe the optical detector in terms of the detector detecting the luminance output of the light source, persons skilled in the art will recognize that such a description includes the detector detecting a part of the luminance output of the light sources. In practical situations, the different light sources 620-1 through 620-N are not necessarily fully complementary. In such situations, at the optical receiver 700, only the complementary parts of the output spectra of the light sources 620-1 through 620-N are filtered and, therefore, separately detected. Thus, the optical detector 710 may detect not the whole luminance output generated by each of the light sources, but a part of the luminance output.

The processing unit 720 is configured for receiving the recovered patterns from the optical detector 710. Thus, continuing with the example above, the processing unit 720 receives the recovered first base pattern, the shifted second pattern, and so on. The processing unit 720 is also configured for receiving the base patterns for the non-reference channels (i.e., the base patterns generated by the light pattern generator 230 before any phase shifting was introduced by the controller 210). The sets of base pulses are used for retrieving the data symbols embedded in the luminance output 605. In one embodiment, the processing unit 720 may receive the sets of base pulses directly from a light pattern generator 730, as shown in FIG. 7 (note that the light pattern generator 730 may be included within the optical receiver 700). In another embodiment, the optical receiver 700 may further comprise a memory 740, where the base patterns are stored in the memory 740, and the processing unit 720 may receive the base patterns from the memory 740 (also shown in FIG. 7). In yet another embodiment, base patterns may be derived from the (wirelessly) received light signals. This could be implemented by defining a time period where the base patterns are transmitted without being modulated (this time period may be referred to as a "training period"). Such training period may occur every time the dimming level of the color channels is changed. In yet another embodiment, the processing unit 720 may receive parameters from which the base patterns may be obtained, such as, for example, the dimming types (e.g., PWM or PDM) and the dimming levels of the different color channels. The processing unit 720 (or the light pattern generator 730) may then reconstruct the base patterns for the channels from the received parameters. In yet another embodiment the processing unit 720 may estimate the duty cycles from the signals received from the optical detector 710. is the duty cycles may then used to generate the base patterns using an algorithm (in either the processing unit 720 or the light pattern generator 730) or reading it out from the relevant pattern stored in the memory 740.

Once the processing unit 720 received the first and second base patterns and shifted second pattern, the processing unit 720 is configured to determine, for each of the frame periods T2, a first phase difference between the second base pattern and the first base pattern. The first phase difference may be, for example, zero if the first base pattern and the second base pattern start and/or end at the same time. The processing unit 720 is also configured to determine, for each of the frame periods, a second phase difference between the shifted second pattern and the first base pattern. By comparing the second phase difference with the first phase difference for each of the frame periods, the processing unit 720 may retrieve the data symbols of the data signal 245.

Figure 8A:
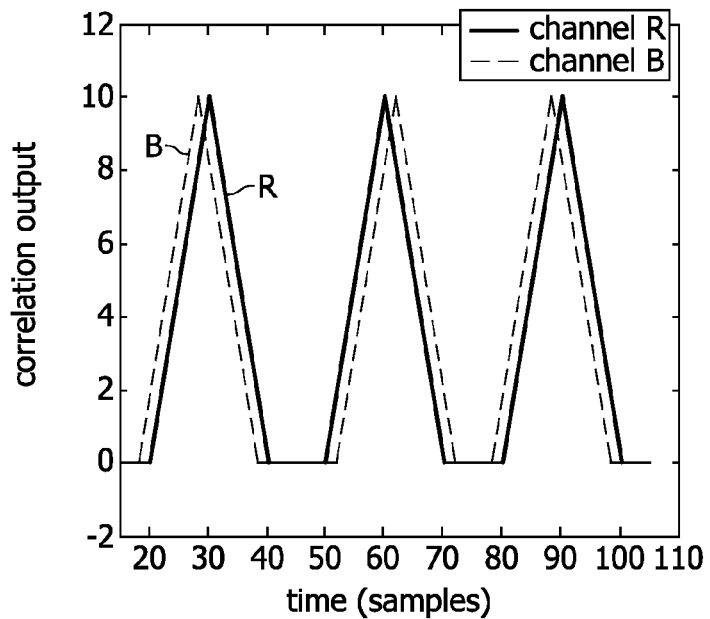
FIG. 8A illustrates correlation with base pulses for two PWM color channels, according to one embodiment of the present invention.
Figure 8B:
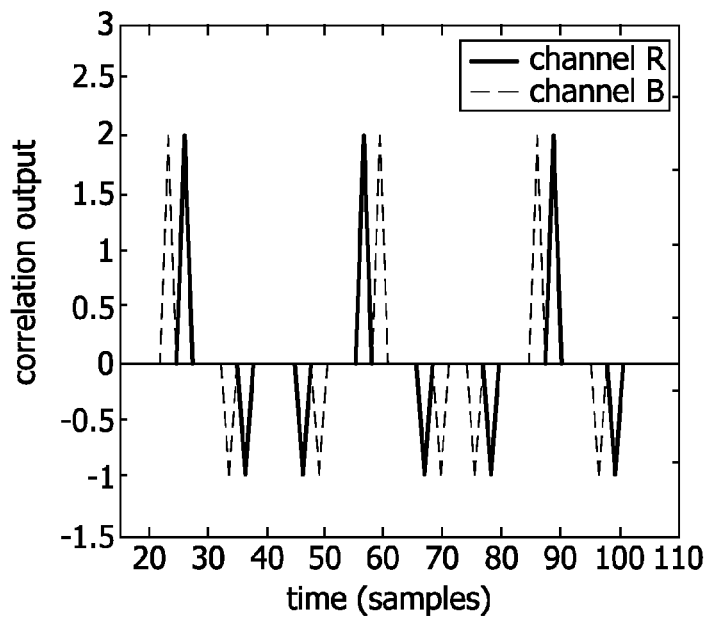
FIG. 8B illustrates correlation of high-pass filtered signals for two PWM color channels, according to one embodiment of the present invention.

For PWM, the output of the photo sensors can be directly compared with the base patterns. Doing so will result in pulses similar to the ones illustrated in FIG. 8A, where R designates the reference channel and B designates the non-reference channel. The width of the triangular pulse is directly related to the pulse width. The difference in peak positions in the R and B channel corresponds to the embedded data symbols. In this example, "010" is transmitted. Alternatively, the digitized detected luminance outputs and/or the base patterns may first be differentiated, e.g. by passing through a high-pass filter, and then correlated. An example of the resulting correlation output is given in FIG. 8b for the same data. Peak detection is much easier for this case, however, the correlation levels are smaller, making retrieval of the embedded data more susceptible to noise. The negative correlation outputs relate to the end of the base patterns, which are not relevant for the inter-phase modulation scheme.

Figure 9:
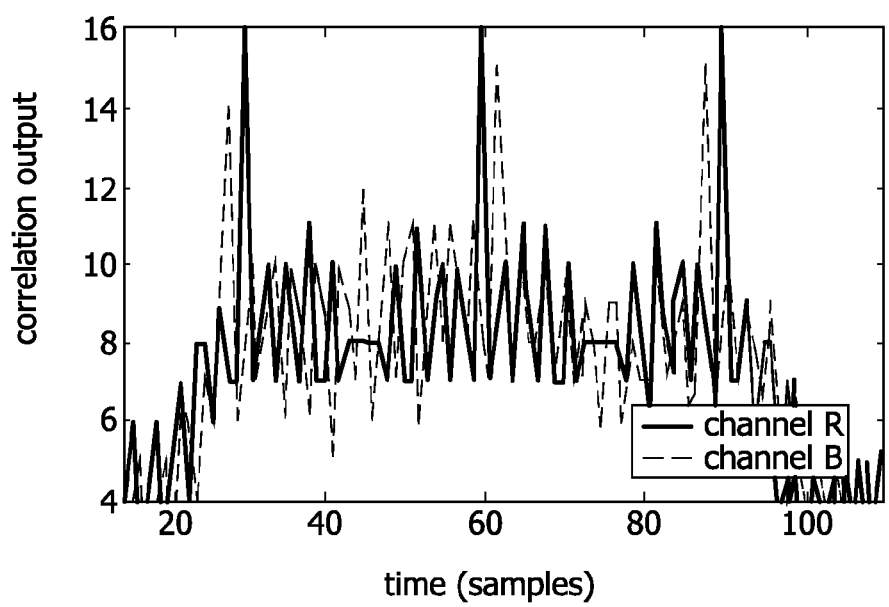
FIG. 9 illustrates output correlation for two PDM color channels, according to one embodiment of the present invention.

Similar results are given for two PDM channels in FIG. 9. In this case, higher correlation values may be observed. Also in this case there is non-perfect alignment between the reference pulse and the received signal. However, the peaks are still clearly observable and, hence, the data symbols of the data signal 245 may be successfully decoded.

One advantage of the present invention is that the data symbols may be embedded in a luminance output of an illumination device while keeping the short-time average light output of an illumination device constant, decreasing the visible flicker and allowing the use of lower switching frequencies relative to the prior art approaches. In addition, higher data throughput may be achieved by embedding data in parallel data streams using several color channels. Furthermore, the present invention may address frequency/clock variations in the illumination device, since all color channels use the same clock and the embedded data is determined relative to one color channel which may be used as frequency/timing reference.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

While the forgoing is directed to embodiments of the present invention, other and further embodiments of the invention may be devised without departing from the basic scope thereof. For example, aspects of the present invention may be implemented in hardware or software or in a combination of hardware and software. Therefore, the scope of the present invention is determined by the claims that follow.

The invention claimed is:

1. An illumination system including:
    at least one illumination device, the illumination device comprising:
        a first light source configured to generate, in response to a first drive signal, a first luminance output having a first output spectrum of visible light;
        a second light source configured to generate, in response to a second drive signal, a second luminance output having a second output spectrum of visible light different from the first output spectrum, the illumination device producing a luminance output of visible light comprising both the first luminance output and the second luminance output; and
        a controller configured for:
            receiving a first base pattern within a frame period and a second base pattern, separate from the first base pattern, within the frame period, wherein the first base pattern and the second base pattern are both variable to adjust a power level and color of the luminance output of the illumination device,
            generating a shifted second pattern by phase shifting the second base pattern within the frame period with respect to the first base pattern in response to a data signal such that the one or more data symbols of the data signal are embedded in the luminance output of the illumination device,
            providing the first base pattern to the first light source as the first drive signal, and
            providing the shifted second base pattern to the second light source as the second drive signal; and
    a remote control device for controlling the at least one illumination device, the remote control comprising at least one optical receiver comprising:
        an optical detector configured for separately detecting at least a portion of the first luminance output of the first light source and at least a portion of the second luminance output of the second light source; and
        a processing unit configured for:
            receiving the first base pattern and the second base pattern within the frame period,
            receiving the shifted second pattern based on the detected portion of the second luminance output,
            determining a first phase difference between the second base pattern and the first base pattern for the frame period,
            determining a second phase difference between the shifted second pattern and the first base pattern for the frame period, and
            determining one or more of the data symbols of the data signal by comparing the second phase difference with the first phase difference for the frame period.

2. The illumination system of claim 1, wherein the optical receiver further comprises a memory, wherein:
    the first base pattern and the second base pattern are stored in the memory, and
    the processing unit is configured to receive the first base pattern and the second base pattern from the memory.

3. The illumination system of claim 1, wherein the processing unit of the optical receiver is configured to receive the first base pattern and the second base pattern from one of the one or more illumination devices.

4. The illumination system of claim 1, wherein the data signal is a binary signal and the one or more of the data symbols are determined by a direction of phase shifting of the second base pattern with respect to the first base pattern.

5. An illumination system including at least one illumination device, the illumination device comprising:
    a first light source configured to generate, in response to a first drive signal, a first luminance output having a first output spectrum of visible light;
    a second light source configured to generate, in response to a second drive signal, a second luminance output having a second output spectrum of visible light different from the first output spectrum, the illumination device producing a luminance output of visible light comprising both the first luminance output and the second luminance output; and a controller configured for:

receiving a first base pattern within a frame period and a second base pattern, separate from the first base pattern, within the frame period, wherein the first base pattern and the second base pattern are both variable to adjust a power level and color of the luminance output of the illumination device, generating a shifted second pattern by phase shifting the second base pattern within the frame period with respect to the first base pattern in response to a data signal such that the one or more data symbols of the data signal are embedded in the luminance output of the illumination device, providing the first base pattern to the first light source as the first drive signal, providing the shifted second base pattern to the second light source as the second drive signal; and encoding each of the one or more of the data symbols in the luminance out of the illumination device as a phase difference in the frame period between the second shifted pattern embedded in the second luminance output and the first base pastern embedded in the first luminance output.

6. The illumination system of claim 5, wherein the data signal is a binary signal and one or more of the data symbols embedded in the luminance output of the illumination device are determined by a direction of phase shifting of the second base pattern with respect to the first base pattern.

7. The illumination system of claim 5, wherein the data signal is a multilevel signal and one or more of the data symbols embedded in the luminance output of the illumination device are determined by a direction and an amount of phase shifting of the second base pattern with respect to the first base pattern.

8. The illumination system of claim 5, further comprising means for providing the first base pattern and the second base pattern, or derivatives thereof, to an optical receiver.

9. The illumination system of claim 5, further comprising a light pattern generator configured to receive a light setting for setting the power level and color of the luminance output of the illumination device, and in response to the light setting to generate the first and second base patterns corresponding to the light setting.

10. The illumination system of claim 5, wherein each of the first base pattern and the second base pattern is a pulse density modulation (PDM) pattern wherein a density of the pulses in the first base pattern within the frame period indicates a dimming level of the first luminance output and wherein a density of the pulses in the second base pattern within the frame period indicates a dimming level of the second luminance output.

11. The illumination system of claim 5, wherein each of the first base pattern and the second base pattern is a pulse width modulation (PWM) pattern wherein a width of a pulse in the first base pattern within the frame period indicates a dimming level of the first luminance output and wherein a width of a pulse in the second base pattern within the frame period indicates a dimming level of the second luminance output.

12. The illumination system of claim 5, further comprising:

a third light source configured to generate, in response to a third drive signal, a third luminance output having a third output spectrum of visible light different from the first and second output spectra, wherein the controller is further configured for:

receiving a third base pattern within the frame period, wherein the third base pattern is variable to adjust a power level and color of the luminance output of the illumination device, generating a shifted third pattern by phase shifting the third base pattern within the frame period with respect to the first base pattern in response to the data signal such that the one or more of the data symbols are embedded in the luminance output of the illumination device, and providing the shifted third base pattern to the third light source as the third drive signal.

13. The illumination system of claim 12, further comprising a demultiplexer configured to demultiplex the data signal into a first data stream and a second data stream, wherein the controller generates the shifted second pattern by phase shifting the second base pattern in response to the first data stream of the data signal and generates the shifted third pattern by phase shifting the third base pattern in response to the second data stream of the data signal.

14. A method for embedding one or more data symbols of a data signal in a luminance output of an illumination device, the method comprising:

receiving a first base pattern and a second base pattern within a frame period the first base pattern being varied to adjust a power level of a first visible color of the luminance output and the second base pattern being varied to adjust a power level of a second visible color of the luminance output, the second visible color being different than the first visible color;

generating a shifted second pattern by phrase shifting the second base pattern within the frame period with respect to the first base pattern in response to the data signal comprising data symbols such that the one or more of the data symbols are embedded in the luminance output of the illumination device;

generating, in response to the first base pattern, a first luminance output having the first visible color;

generating, in response to the shifted second pattern, a second luminance output having the second visible color; and encoding each of the one or more of the data symbols in the luminance output of the illumination device as a phase difference in the frame period between the second shifted pattern embedded in the second luminance output and the first base pattern embedded in the first luminance output, wherein the luminance output of the illumination device comprises the first luminance output and the second luminance output.

15. The method of claim 14, wherein the data signal is a binary signal and one or more of the data symbols embedded in the luminance output are determined by a direction of phase shifting of the second base pattern with respect to the first base pattern.

16. The method of claim 14, further comprising receiving a light setting for setting the power level and color of the luminance output of the illumination device, and in response to the light setting to generate the first, second, and third base patterns corresponding to the light setting.

17. The method of claim 14, wherein each of the first base pattern and the second base pattern is a pulse density modulation (PDM) pattern wherein a density of the pulses in the first base pattern within the frame period indicates a dimming level of the first luminance output and wherein a density of the pulses in the second base pattern within the frame period indicates a dimming level of the second luminance output.

18. The method of claim 14, wherein each of the first base pattern and the second base pattern is a pulse width modulation (PWM) pattern wherein a width of a pulse in the first base pattern within the frame period indicates a dimming level of the first luminance output and wherein a width of a pulse in the second base pattern within the frame period indicates a dimming level of the second luminance output.

19. The method of claim 14, further comprising:
   receiving a third base pattern within the frame period, the third base pattern being varied to adjust a power level of a third visible color of the luminance output, the third visible color being different than the first and second visible colors; and
   generating a shifted third pattern by phase shifting the third base pattern within the frame period with respect to the first base pattern in response to the data signal comprising data symbols such that the one or more of the data symbols are embedded in the luminance output of the illumination device, and
   generating, in response to the shifted third pattern a third luminance output having the third color,
   wherein the luminance output of the illumination device further comprises the third luminance output.

\* \* \* \* \*